United States Patent
Druhan

(10) Patent No.: US 7,726,340 B2
(45) Date of Patent: Jun. 1, 2010

(54) FLEXIBLE, HERMETIC PIVOT SEAL FOR TORQUE MOTOR

(75) Inventor: David T. Druhan, South Bend, IN (US)

(73) Assignee: Honeywell International Inc., Morristown, NJ (US)

(*) Notice: Subject to any disclaimer, the term of this patent is extended or adjusted under 35 U.S.C. 154(b) by 703 days.

(21) Appl. No.: 11/594,869

(22) Filed: Nov. 9, 2006

(65) Prior Publication Data

US 2008/0110513 A1 May 15, 2008

(51) Int. Cl.
*F14B 13/043* (2006.01)
(52) U.S. Cl. .............................. 137/625.63; 137/625.66
(58) Field of Classification Search ............ 137/625.63, 137/625.66
See application file for complete search history.

(56) References Cited

U.S. PATENT DOCUMENTS

| | | | |
|---|---|---|---|
| 2,962,611 A | 11/1960 | Atchley | |
| 3,025,867 A | 3/1962 | Lucien | |
| 3,051,008 A | * 8/1962 | Hamren | ...................... 74/18.1 |
| 3,386,343 A | 6/1968 | Gray | |
| 3,698,437 A | 10/1972 | Cox | |
| 3,714,610 A | 1/1973 | Duff et al. | |
| 3,819,494 A | * 6/1974 | Fountain | ..................... 205/718 |
| 3,832,014 A | 8/1974 | Deschenes et al. | |
| 3,874,405 A | 4/1975 | Thayer | |
| 3,908,360 A | 9/1975 | Meyer et al. | |
| 3,910,314 A | 10/1975 | Nicholson | |
| 4,201,114 A | 5/1980 | Cobb et al. | |
| 4,378,031 A | 3/1983 | Nicholson et al. | |
| 4,560,969 A | 12/1985 | Nicholson | |
| 5,115,638 A | 5/1992 | Reed et al. | |
| 5,183,351 A | * 2/1993 | Schneider | ................... 277/636 |
| 5,244,002 A | 9/1993 | Frederick | |
| 5,253,676 A | 10/1993 | Craig | |
| 5,473,298 A | 12/1995 | Teutsch et al. | |
| 6,095,490 A | 8/2000 | Nakano et al. | |
| 6,581,904 B2 | 6/2003 | Watanabe et al. | |
| 6,598,385 B1 | 7/2003 | Abel et al. | |
| 6,874,755 B2 | 4/2005 | Bircann | |

FOREIGN PATENT DOCUMENTS

DE 4431600 A1 3/1996

OTHER PUBLICATIONS

EP Search Report, 07120299.8, dated Mar. 18, 2008.

* cited by examiner

*Primary Examiner*—John Rivell
*Assistant Examiner*—Craig M Schneider
(74) *Attorney, Agent, or Firm*—Ingrassia Fisher & Lorenz, P.C.

(57) ABSTRACT

A torque motor (10) includes a support (20), a jet tube passage (42) in the support having a first end opening (43) and a second end opening (45), a jet tube (30) extending into the jet tube passage (42) through the first end opening (43) for directing a flow of fluid into a chamber (40) in fluid communication with the jet tube passage second end opening (45), and a flexible, convoluted, seal (46) hermetically connected to the jet tube passage (42) and the jet tube (30) for sealing the jet tube passage first end (43) while permitting at least a portion of the jet tube (30) to move relative to the jet tube passage (42).

10 Claims, 5 Drawing Sheets

FLEXIBLE, HERMETIC PIVOT SEAL FOR TORQUE MOTOR

FIELD OF THE INVENTION

The present invention is directed toward a torque motor having a hermetic seal between a jet tube and a jet tube housing, and, more specifically, toward a torque motor having a flexible, hermetic sealing element connected between the jet tube and the jet tube housing.

BACKGROUND OF THE INVENTION

Torque motors may be used to form the first stage of a two-stage electrohydraulic servo-valve (EHSV). FIG. 9 illustrates a conventional torque motor 200, with its pole plates removed for clarity. Torque motor 200 includes a jet tube or flapper tube 202 through which a fluid is directed under pressure through a jet 214 at the end of the jet tube 202 toward the openings of two adjacent control passages 204, 206. The motor 200 includes one or more windings 210 that are used to rotate armature 212 which is connected to jet tube 202. By controlling the position of armature 212, the position of jet 214 relative to the control passages 204, 206 can be affected. The control passages 204, 206 are connected to chambers on opposite ends of a spool valve (not shown, but similar to the spool valve 18 in FIG. 1) in the second stage of the EHSV. A feedback spring (not shown) is coupled to the jet tube 202 and slip fit at a ball end into a mating socket in the spool valve in a conventional manner. Thus by varying the amount of fluid directed toward each control passage 204, 206 the position of the spool valve can be controlled.

The jet tube 202 itself is contained within a jet tube housing 208 which is in fluid communication with a chamber 216, and the openings of the control passages 204, 206 are located in the chamber 216, spaced from the end of the jet tube 202. While some of the fluid leaving the jet 214 enters one or the other of the control passages 204, 206, much enters the chamber 216 and flows into the space around the jet tube 202 inside the jet tube housing 208 before passing out of the EHSV through an output line (not shown).

The jet tube 202 must be free to pivot to a limited degree within the jet tube housing 208, and at the same time a seal must be provided in the jet tube housing 208 to prevent fluid from leaking out of the jet tube housing 208. This has previously been done by providing an elastomeric packing such as an O-ring seal 218 between the jet tube 202 and the jet tube housing 208 and using an aluminum plug to limit movement of the O-ring. However, such seals tend to fail or exhibit degraded performance at low temperatures. High magnitude performance shifts over temperature or pressure extremes are common. It would therefore be desirable to provide an improved seal that offers improved performance over a wider range of operating temperatures and/or pressures.

SUMMARY OF THE INVENTION

These problems and others are addressed by the present invention, a first aspect of which comprises a torque motor that includes a support, a jet tube passage in the support having a first end opening and a second end opening, and a jet tube extending into the jet tube passage through the first end opening for directing a flow of fluid into a chamber in fluid communication with the jet tube passage second end opening. A flexible, convoluted, seal is hermetically connected to the jet tube passage and the jet tube and seals the jet tube passage first end while permitting at least a portion of the jet tube to move relative to the jet tube passage.

Another aspect of the invention comprises a torque motor that includes a support, a jet tube passage in the support having a first end opening and a second end opening, and a jet tube extending into the jet tube passage through the first end opening for directing a flow of fluid into a chamber in fluid communication with the jet tube passage second end opening. A flexible metallic seal is brazed or electrojoined to the jet tube passage and to the jet tube to seal the jet tube passage first end while permitting the jet tube to pivot in the jet tube passage.

BRIEF DESCRIPTION OF THE DRAWINGS

These aspects and features of embodiments of the present invention will be better understood after a review of the following detailed description together with the attached drawings wherein.

DETAILED DESCRIPTION

Figure 1:
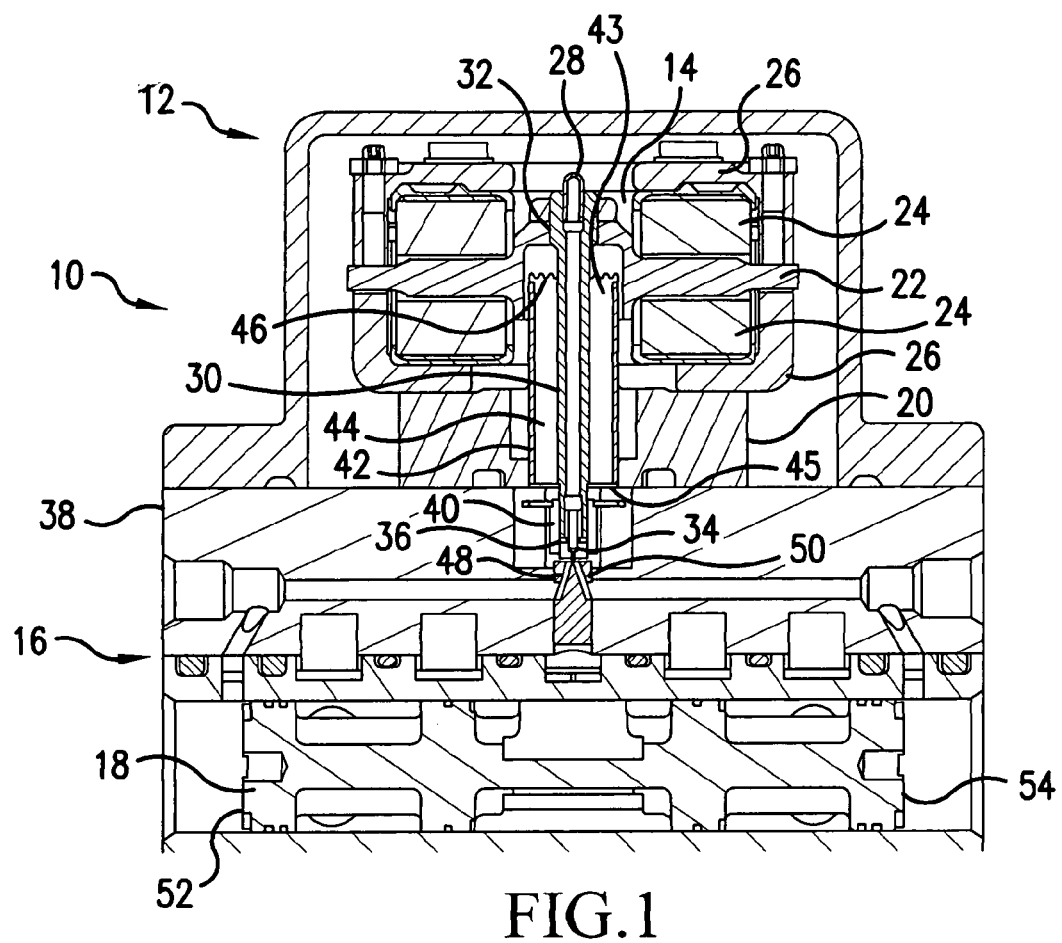
FIG. 1 is an elevational view, partly in section, of an electrohydraulic servovalve that includes a first stage torque motor with a seal according to a first embodiment of the present invention.
Figure 2:
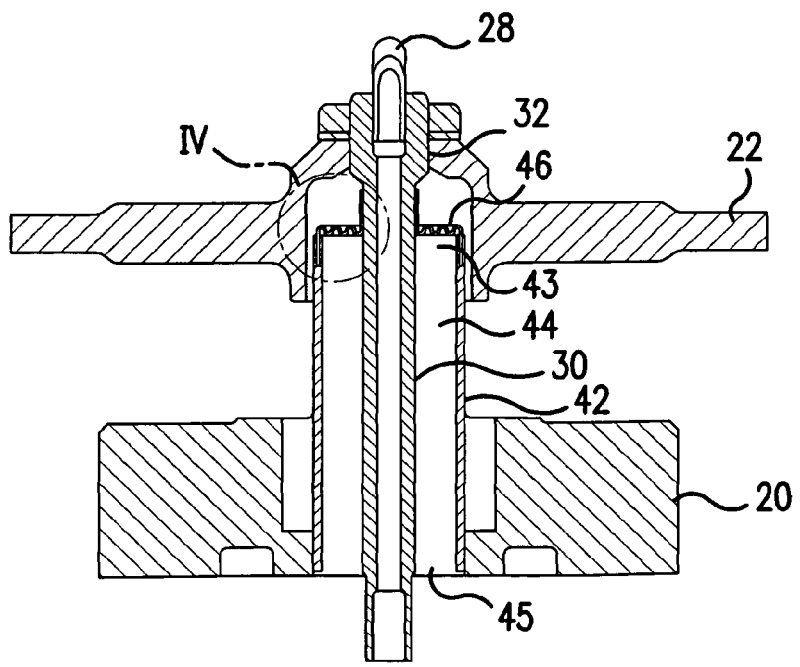
FIG. 2 is a sectional elevational view of the torque motor of FIG. 1 with windings and pole plates removed for illustration purposes.

Referring now to the drawings, wherein the showings are for purposes of illustrating presently preferred embodiments of the invention only and not for the purpose of limiting same, FIG. 1 illustrates an electrohydraulic servovalve (EHSV) 10 comprising a first stage 12 that includes a torque motor 14 and a second stage 16 that includes a spool valve 18. The torque motor comprises an armature support 20 supporting armature 22, windings 24 and pole pieces 26. By controlling the current flowing through the windings, armature 22 can be caused to rotate clockwise or counterclockwise (with reference to the armature as illustrated in FIG. 1) in a well-known manner. Relative terms such as "clockwise," "upper" and "lower" may be used herein with reference to the elements illustrated in particular drawing figures. These descriptions are not intended to limit the orientations in which the embodiments of the present invention are used.

The first stage 12 also includes a fluid supply tube 28 connected to a jet tube 30 which extends through an opening 32 in a central portion of armature 22 and which includes a nozzle 34 at distal end 36. The armature is connected to the jet tube 30 so that rotation of the armature 22 causes jet tube 30 to pivot and the distal end 36 to move. The position of nozzle 34 can therefore be controlled by controlling the current applied to windings 24.

Armature support 20 is mounted on the housing 38 of second stage 16 over a chamber 40 such that jet tube 30 extends past a bottom surface of the armature support 20 and into chamber 40. A tubular jet tube housing 42 having a first end opening 43 and a second end opening 45 extends from the bottom of armature support 20 toward armature 22 and forms a jet tube passage 44 surrounding jet tube 30 at a spacing such that jet tube 30 can pivot within jet tube passage 44 without contacting the wall of the jet tube housing 42. A seal 46, described hereafter, connects jet tube 30 and jet tube housing 42 and prevents fluid from leaking from first end 43 of jet tube housing 42.

First and second passages 48, 50 leading to chambers at first and second ends 52, 54 of spool valve 18 terminate in chamber 40. Armature 22 has a neutral position such that jet 34 is directed generally between the first and second passages 48, 50. The rotation of armature 22 controls the position of jet 34 and thus controls the amount of fluid flow directed toward each of the first and second passages 48, 50. When jet 34 directs more fluid toward first passage 48, the pressure on first end 52 of spool valve 18 becomes greater than the pressure on second end 54 of spool valve 18 and shifts spool valve 18 in the direction of second end 54—toward the right as viewed in FIG. 1. A conventional feedback spring (not shown) is connected between the spool valve 18 and jet 34 and pulls jet 34 back toward a neutral position as the spool valve moves. Directing jet 34 toward second passage 50 shifts spool valve 18 in the opposite direction. The position of the spool may be used to control fluid flow through various additional fluid flow passages (not shown) in a well-known manner that will not be further described herein.

Figure 3:
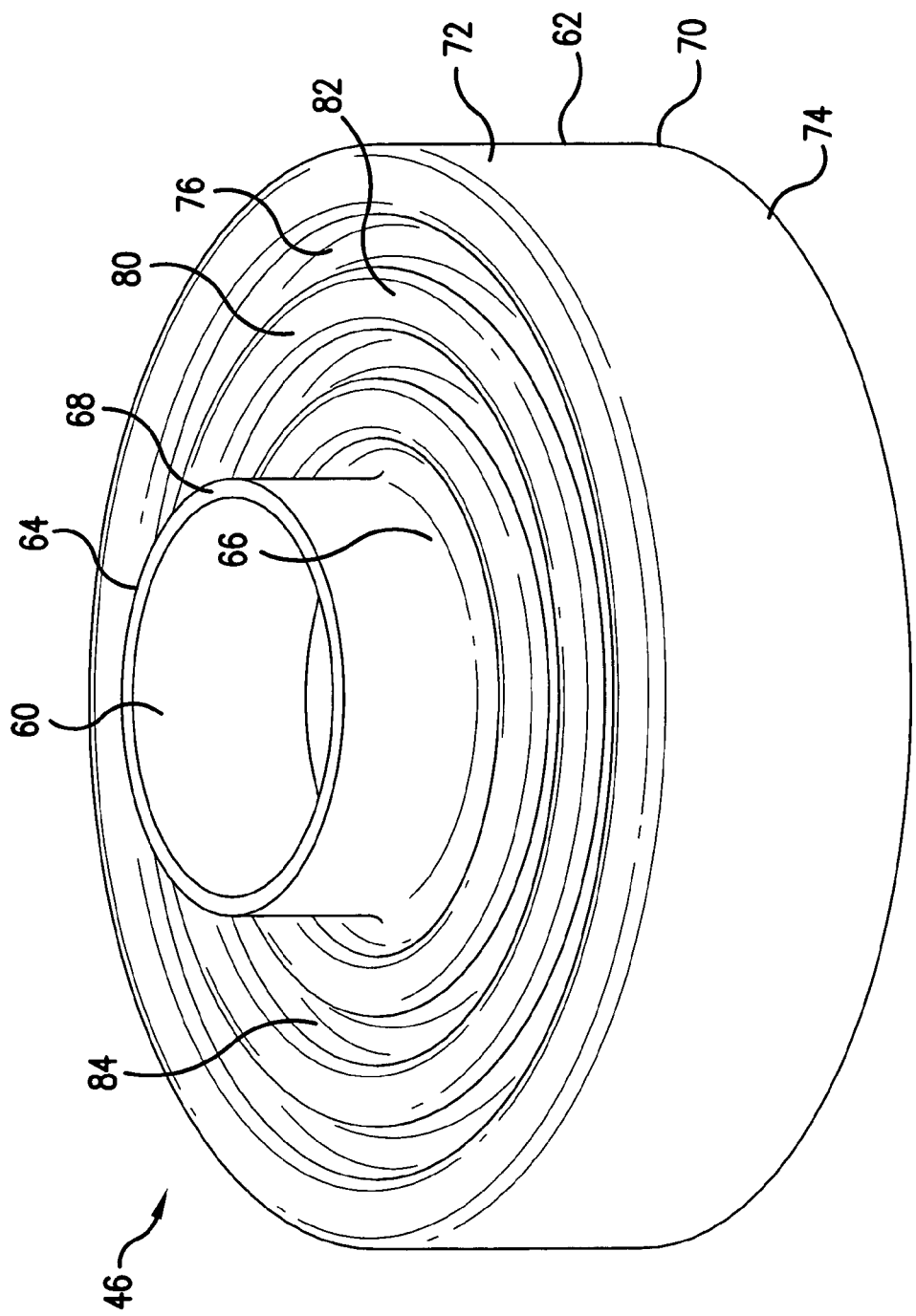
FIG. 3 is a perspective view of the seal of FIG. 1.
Figure 4:
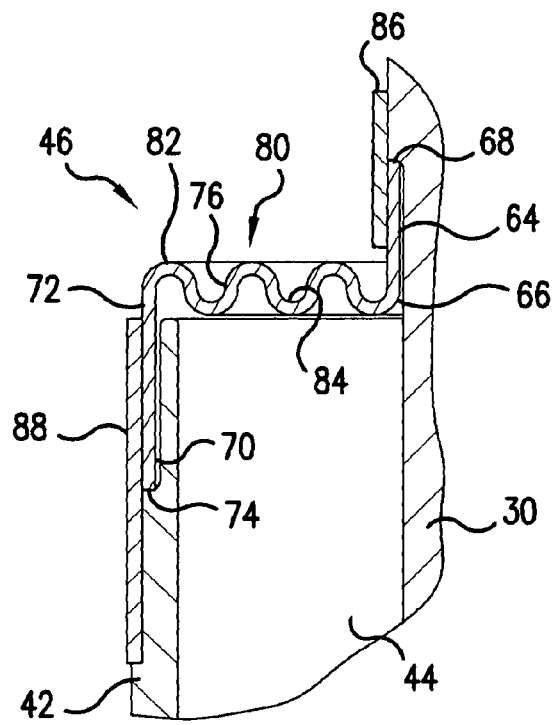
FIG. 4 is a detail view of region IV in FIG. 2.
Figure 9:
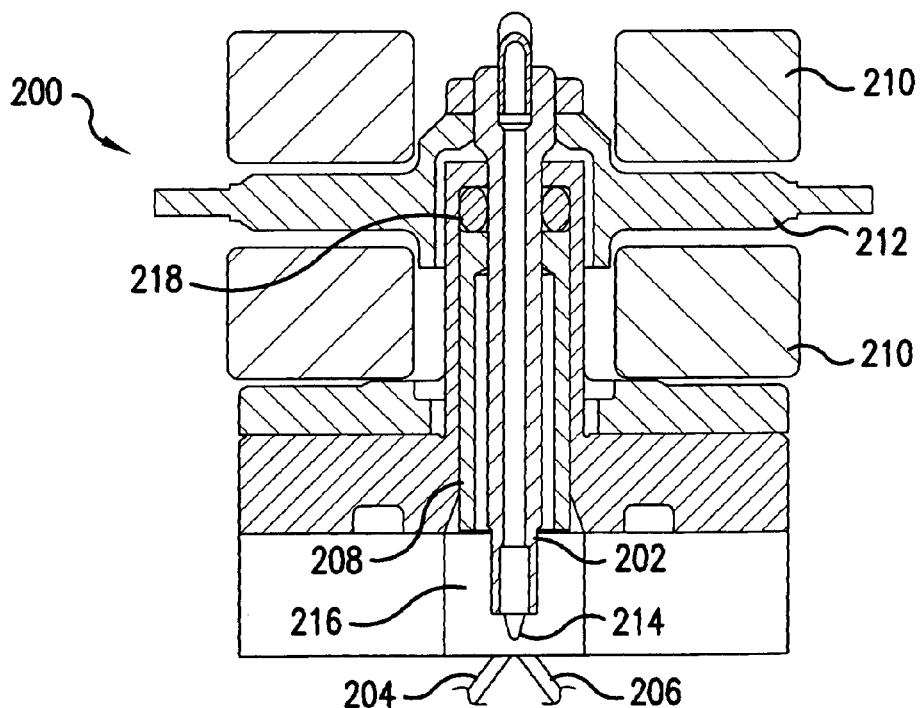
FIG. 9 is a sectional elevational view of an electrohydraulic servovalve including a first stage torque motor that includes a conventional seal.

As best seen in FIG. 3, seal 46 comprises an inner surface 60, an outer surface 62, an inner projecting sleeve 64 having a lower portion 66 and an upper end 68 and an outer projecting sleeve 70 having an upper portion 72 and a lower end 74. A convoluted wall 76 connects lower portion 66 of inner projecting sleeve 64 with upper portion 72 of outer projecting sleeve portion 70. Convoluted wall 76 comprises a plurality of concentric, annular convolutions 80 having radiused crests 82 and troughs 84 which form a sine-wave-like pattern when viewed in section.

Seal 46 may be formed in any conventional manner, such as by stamping or hydroforming; however, electroforming the seal from a high-strength nickel-cobalt alloy is presently preferred. A presently preferred nickel-cobalt alloy is available from the Nicoform, Inc. of Rochester, N.Y., under the trade name NiColoy. In such an electroforming process, a nickel-cobalt alloy is deposited by plating one molecule at a time onto an aluminum mandrel that has the shape of the convoluted diaphragm on its face. When a desired thickness is obtained in a plating bath, the mandrel and plated diaphragm are removed from the plating tank. The mandrel is then released from the diaphragm by dissolving it in a chemical solution. This electroforming process is followed by a stress-relieving heat treatment process, about one hour at 300 degrees C., for example, to provide a homogeneous, relatively stress-free seal element. When formed in this manner, seal 46 beneficially has high strength, good flexibility, and resistance to high-cycle fatigue. Nickel-cobalt alloys with coefficients of thermal expansion similar to that of the stainless steels to which they are joined also reduces the stresses at the boundaries between the seals and the structures to which they are connected.

To attach seal 46 to jet tube 30 and jet tube housing 42, seal 46 is slid over jet tube 30 so that inner projecting sleeve 64 overlies a portion of the outside of jet tube 30. Outer projecting sleeve 70 is placed over the sidewall of jet tube housing 42 over opening 43, and seal 46 is hermetically sealed to the jet tube 30 and jet tube housing 42. In an embodiment of the present invention, a first metallic band 86, which may comprise a high strength nickel-cobalt alloy, overlies a portion of jet tube 30 and the outer surface 62 of inner projecting sleeve 64. Band 86 may be created by plating the nickel-cobalt alloy over the junction between the jet tube 30 and inner projecting sleeve 64 using an electrojoining process. A second metallic band 88, which may also be a high strength nickel-cobalt alloy, surrounds an outer portion of jet tube housing 42 and overlies the lower end 74 of outer projecting sleeve 70. Second band 88 may also be created by an electrojoining process to connect the seal 46 to the jet tube housing 42. The jet tube housing 42 may be formed from a non-magnetic stainless steel.

In the present embodiment, seal 46 has a thickness between inner surface 60 and outer surface 62 of about 0.005 inches and the diameter of projecting outer sleeve portion 68 is about 0.285 inch. The vertical distance from a crest 82 to a trough 84 of the convoluted wall 76 is about 0.02 inches. The connection between jet tube housing 42 and armature support 20 may be joined using a silver braze alloy that is heated with a micro torch or by electric induction. Seal 46 and jet tube 30 and jet tube housing 42 may alternately be brazed by electric induction heating with a gold nickel palladium alloy in an inert atmosphere.

In use, torque motor 14 is turned to move armature 22 and thus jet 34 relative to first and second passageways 48 and 50. The convolutions 80 in seal 46 allow convoluted wall 76 to elastically bend and/or deform and this allows the jet tube 30 to pivot while maintaining hermetic seals between the seal 46 and the jet tube 30 and the jet tube passage 42. The effective centerline of seal 46 is placed at the center of the axis of rotation of the torque motor 14 to help minimize stress at the brazed seams. The convolutions provide good compliance at normal operating temperatures and maintain integrity when exposed to high internal fluid pressure. System spring rate, the rate at which jet tube 30 and armature 22 return jet 36 to a neutral position is largely unaffected by this new seal 46. In addition, armature 22 controls the distance between jet tube 30 and control passages 48, 50 so that seal 46 is not subjected to significant stresses in the direction parallel to the centerline of jet tube 30.

Figure 5:
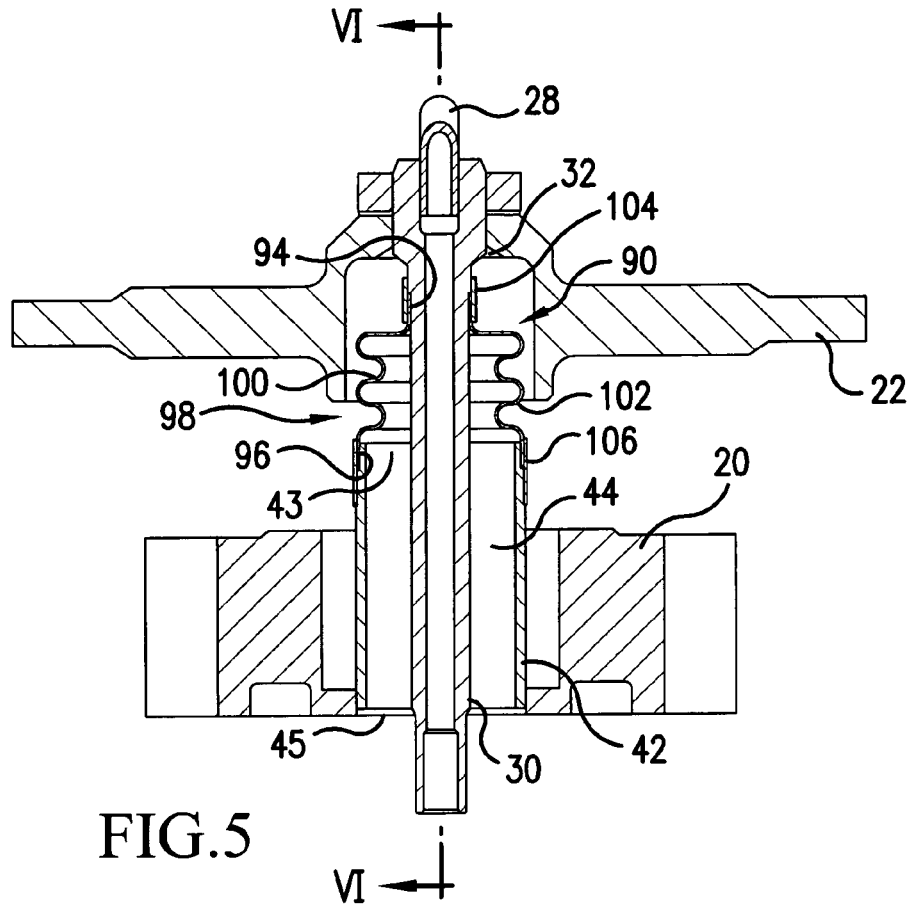
FIG. 5 is a sectional elevational view of a first stage torque motor for an electrohydraulic servovalve which torque motor includes a seal according to a second embodiment of the present invention.
Figure 6:
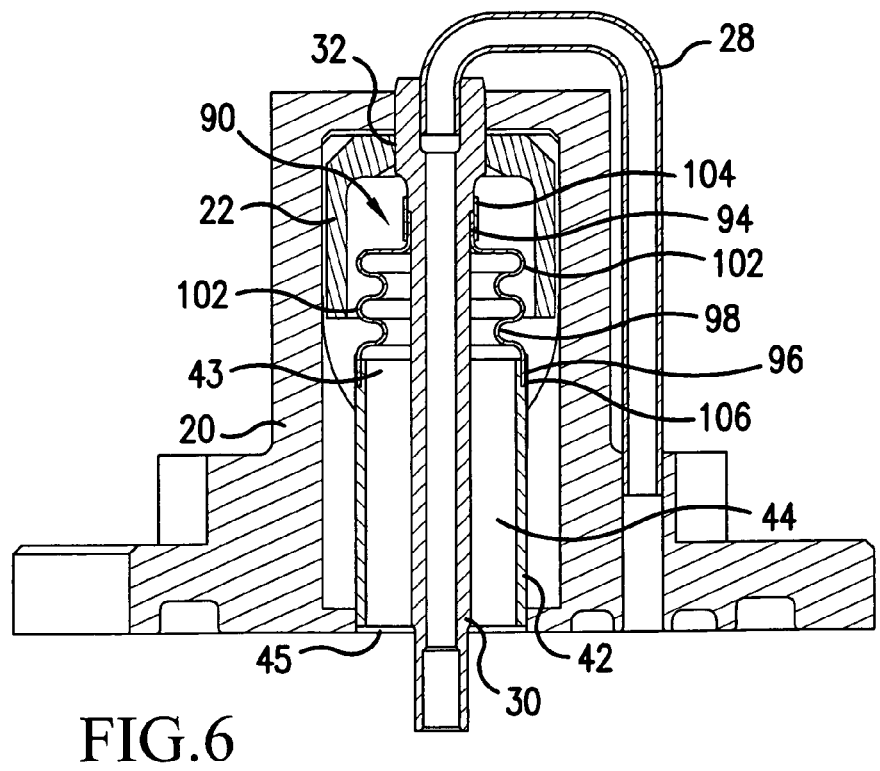
FIG. 6 is a sectional elevational view taken along line VI-VI of FIG. 5.

A second embodiment of the invention is illustrated in FIGS. 5 and 6 which includes an alternative seal 90 and wherein elements present in the first embodiment are identified by like reference numerals and in which only the portions of the torque motor 14 in the vicinity of seal 90 are illustrated. Seal 90 includes an inner sleeve portion 94 spaced from an outer sleeve portion 96 by a central or bellows portion 98 which includes a plurality of circular convolutions 100 having radiused turns 102 and a generally sine-wave-shape when viewed in vertical cross section. Inner sleeve portion 94 overlies an outer wall of jet tube 30 and is joined by creating a band 104 by plating a high strength nickel-cobalt alloy over the junction using an electrojoining process as described in connection with the first embodiment. Outer sleeve portion 96 is secured to an outer surface of jet tube housing 42 by creating a second band 106 by plating a high strength nickel-cobalt alloy over the junction using an electrojoining process. Bellows 98 has a lower spring rate than the bellows 46 of the first embodiment discussed above but is also less compact. The decision on which seal design to use would therefore be dictated by the requirements of particular applications.

Figure 7:
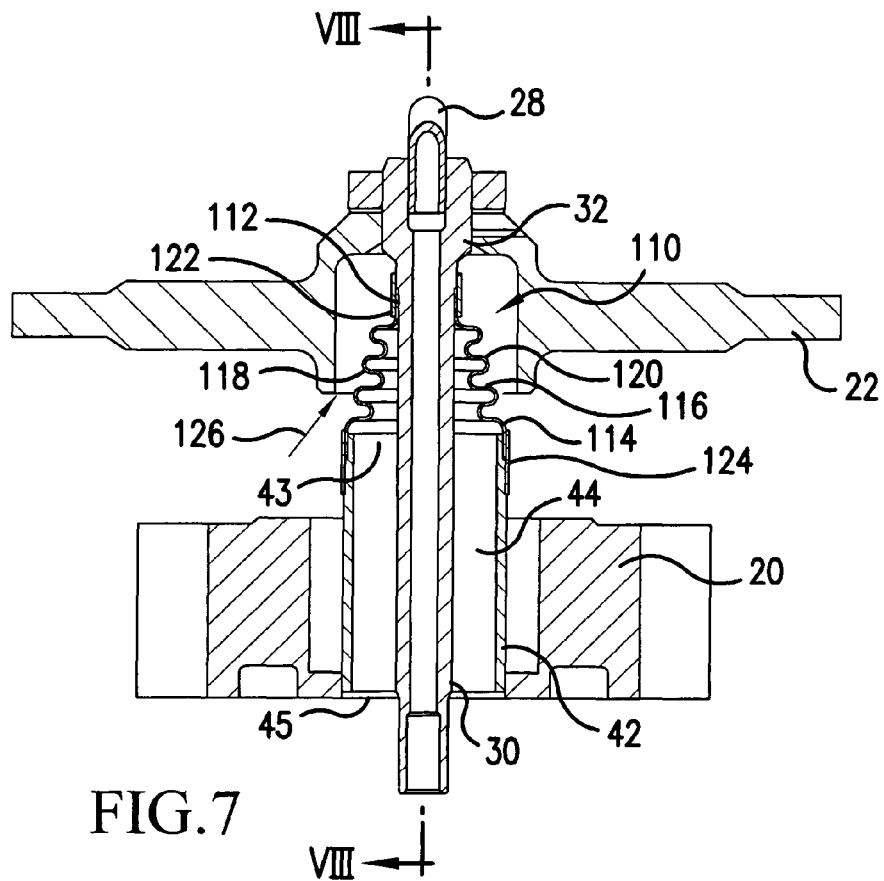
FIG. 7 is a sectional elevational view of a first stage torque motor for an electrohydraulic servovalve which torque motor includes a seal according to a third embodiment of the present invention.
Figure 8:
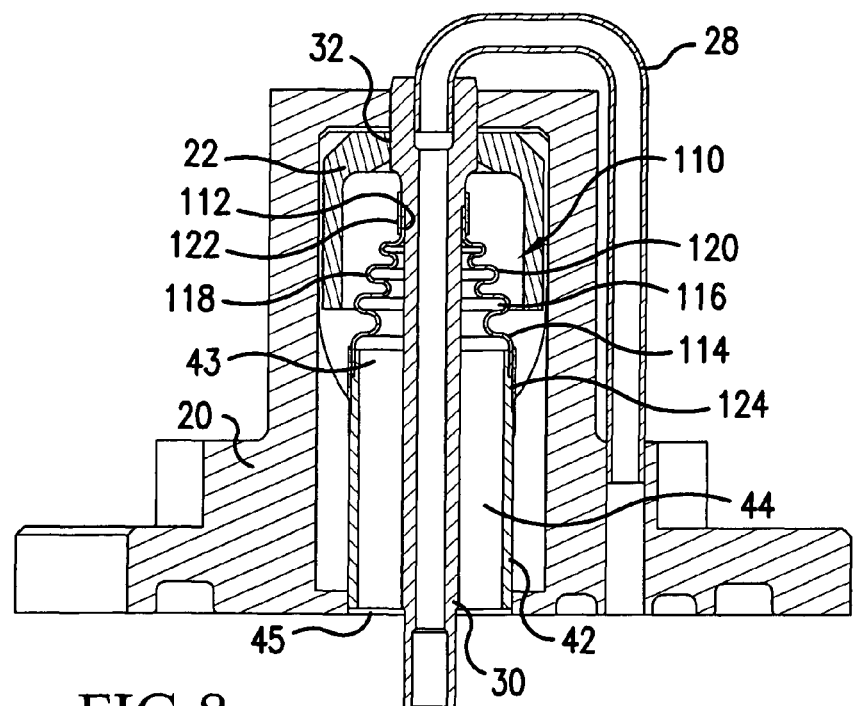
FIG. 8 is a sectional elevational view taken along line VIII-VIII of FIG. 7.

A third embodiment of the invention is illustrated in FIGS. 7 and 8 which includes an alternative seal 110 and wherein elements present in the first two embodiments are identified by like reference numerals and in which only the portions of the torque motor 14 in the vicinity of seal 110 are illustrated. Seal 110 includes an inner sleeve portion 112 spaced from an outer sleeve portion 114 by a central or bellows portion 116 which includes a plurality of circular convolutions 118 having radiused turns 120 which taper inwardly from outer sleeve portion 114 to inner sleeve portion 112. The radiused turns 120 are generally sine-wave-shape when viewed in vertical cross section. Inner sleeve portion 112 overlies an outer wall of jet tube 30 and is joined by creating a band 122 by plating a high strength nickel-cobalt alloy over the junction using an electrojoining process as described in connection with the first embodiment. Outer sleeve portion 114 is secured to an outer surface of jet tube housing 42 by creating a second band 124 by plating a high strength nickel-cobalt alloy over the junction using an electrojoining process. Bellows 116 provides flexibility and allows jet tube 30 to pivot with the rotation of armature 22. The spring rate of this design would be somewhere between the spring rate of the first and second embodiments described above. As an additional benefit, the taper of bellows 116 allows band 122 to be visually inspected along a line-of-sight indicated by arrow 126.

The present invention has been described herein in terms of several preferred embodiments. However, obvious modifications and additions to these embodiments will become apparent to those of ordinary skill in the art upon a reading of the foregoing description. It is intended that all such obvious modifications and additions form a part of the present invention to the extent they fall within the scope of the several claims appended hereto.

I claim:

1. A torque motor comprising:
    a support;
    a jet tube housing in the support, said jet tube housing having a first end opening and a second end opening;
    a jet tube extending into the jet tube passage through the first end opening for directing a flow of fluid into a chamber in fluid communication with the jet tube housing second end opening;
    a flexible, convoluted, metallic seal hermetically connected to said jet tube housing and said jet tube for sealing said jet tube housing first end while permitting at least a portion of said jet tube to move relative to said jet tube housing;
    a first nickel-cobalt alloy band plated to said jet tube housing and to said seal to secure said seal to said jet tube housing; and
    a second nickel-cobalt alloy band plated to said seal and to said jet tube to secure said seal to said jet tube.

2. The torque motor of claim 1 wherein said seal extends away from said jet tube housing first end opening along a side wall of said jet tube.

3. The torque motor of claim 1 wherein said flexible, convoluted seal comprises a bellows.

4. The torque motor of claim 3 wherein said bellows is tapered.

5. The torque motor of claim 1 wherein said flexible, convoluted seal comprises a diaphragm.

6. The torque motor of claim 5 wherein said diaphragm comprises a disk.

7. The torque motor of claim 6 wherein an axis of said disk is aligned with or parallel to an axis of the jet tube housing.

8. The torque motor of claim 6 wherein said convoluted seal comprises a plurality of concentric convolutions.

9. The torque motor of claim 8 wherein said convolutions are annular.

10. The torque motor of claim 8 wherein said convolutions have radiused crests and troughs.

* * * * *